United States Patent
Burton et al.

(10) Patent No.: US 7,282,975 B2
(45) Date of Patent: Oct. 16, 2007

(54) APPARATUS AND METHOD TO CONTROL SELF-TIMED AND SYNCHRONOUS SYSTEMS

(75) Inventors: Edward A. Burton, Hillsboro, OR (US); Paul Madland, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 523 days.

(21) Appl. No.: 10/750,320

(22) Filed: Dec. 31, 2003

(65) Prior Publication Data
US 2005/0146361 A1   Jul. 7, 2005

(51) Int. Cl.
*H03L 7/00* (2006.01)
(52) U.S. Cl. ...................... 327/161; 327/544
(58) Field of Classification Search ............... 327/113, 327/156, 158, 534, 161, 544
See application file for complete search history.

(56) References Cited

U.S. PATENT DOCUMENTS

| | | | |
|---|---|---|---|
| 6,046,937 A * | 4/2000 | Komori et al. | 365/185.04 |
| 6,067,612 A * | 5/2000 | Sasaki et al. | 712/28 |
| 6,166,577 A * | 12/2000 | Mizuno et al. | 327/278 |
| 6,333,571 B1 * | 12/2001 | Teraoka et al. | 307/125 |
| 6,337,601 B1 * | 1/2002 | Klemmer | 331/34 |
| 6,489,833 B1 * | 12/2002 | Miyazaki et al. | 327/534 |
| 6,708,289 B1 * | 3/2004 | Kudo | 714/28 |
| 6,883,078 B2 * | 4/2005 | Chen | 711/165 |

* cited by examiner

*Primary Examiner*—Quan Tra
(74) *Attorney, Agent, or Firm*—Schwegman, Lundberg & Woessner, P.A.

(57) ABSTRACT

An apparatus includes a substrate, a target timing circuit, a leakage timing circuit, and a control unit. The target timing circuit and the leakage timing circuits are formed on the substrate. The target timing circuit has a target timing circuit frequency related to a target frequency. The leakage timing circuit has a leakage timing circuit frequency related to a leakage current. The control unit maintains a substantially constant ratio between the target timing circuit frequency and the leakage timing circuit frequency. A method includes generating a first signal related to a target circuit frequency, generating a second signal related to a leakage current, and adjusting a control signal applied to a substrate to maintain a substantially constant frequency ratio between a first signal and the second signal.

30 Claims, 6 Drawing Sheets

APPARATUS AND METHOD TO CONTROL SELF-TIMED AND SYNCHRONOUS SYSTEMS

FIELD

The present invention is related to control systems. More particularly, the present invention is related to control systems suitable for use in connection with the control of self-timed and synchronous systems formed on a substrate.

BACKGROUND

Self-timed and synchronous systems formed on a substrate, such as a semiconductor die, may not operate at a desired frequency for a particular power or they may not operate at a desired power for a particular frequency. System variables, such as leakage current and active current in self-timed or synchronous systems, affect the frequency of operation and power consumption in such systems. These variables are dependent on operating conditions, such as temperature and voltage, which can vary with time and over the surface of the substrate. Leakage current, in particular, tends to vary over a range of values, when subjected to manufacturing process variations, a range of voltages, and a range of temperatures. This variation poses a barrier when attempting to optimize cost, performance, battery life, and other system-level metrics.

DESCRIPTION

Figure 1A:
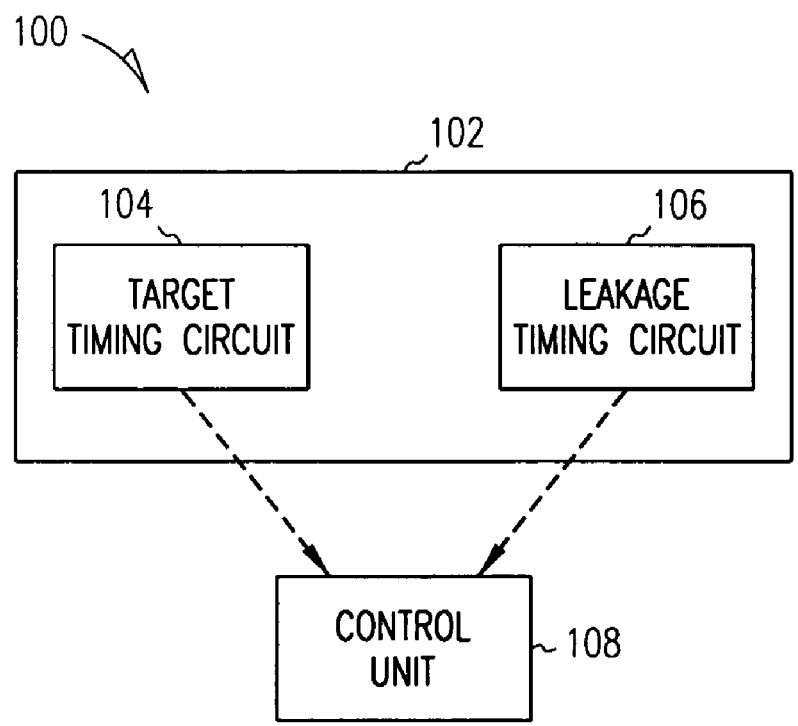
FIG. 1A is a block diagram of an apparatus including a substrate, a target timing circuit, a leakage timing circuit, and a control unit in accordance with some embodiments of the present invention.

In the following description of some embodiments of the present invention, reference is made to the accompanying drawings which form a part hereof, and in which are shown, by way of illustration, specific embodiments of the present invention which may be practiced. In the drawings, like numerals describe substantially similar components throughout the several views. These embodiments are described in sufficient detail to enable those skilled in the art to practice the present invention. Other embodiments may be utilized and structural, logical, and electrical changes may be made without departing from the scope of the present invention. The following detailed description is not to be taken in a limiting sense, and the scope of the present invention is defined only by the appended claims, along with the full scope of equivalents to which such claims are entitled.

FIG. 1A is a block diagram of an apparatus 100 including a substrate 102, a target timing circuit 104, a leakage timing circuit 106, and a control unit 108 in accordance with some embodiments of the present invention. The target timing circuit 104 and the leakage timing circuit 106 are formed on the substrate 102. The control unit 108, as shown in FIG. 1A, is formed off the substrate 102. However, the apparatus 100 is not limited to having the control unit 108 formed off the substrate 102. In some embodiments (not shown), the control unit 108 is formed on the substrate 102. The control unit 108, as shown in FIG. 1A, is not necessarily directly coupled to the target timing circuit 104 and the leakage timing circuit 106. However, in some embodiments, the control unit 108 is directly coupled to the target timing circuit 104 and the leakage timing circuit 106. The dashed lines indicate the relationship maintained by the control unit 108 between the frequency associated with the target timing circuit 104 and the frequency associated with the leakage timing circuit 106. The control unit 108 maintains a substantially constant ratio between the frequency associated with the target timing circuit 104 and the frequency associated with the leakage timing circuit 106.

The substrate 102 is not limited to a particular type of material or combination of materials. In some embodiments, the substrate 102 includes a semiconductor. Silicon is an exemplary semiconductor suitable for use in connection with the substrate 102.

The target timing circuit 104 and the leakage timing circuit 106, in some embodiments, include oscillators. An oscillator is a circuit capable of maintaining electronic oscillations. The frequency of a free-running oscillator may vary with supply voltage, substrate voltage, and/or temperature. The frequency of a free-running oscillator may also vary with manufacturing process variations. The signal of a free-running oscillator may not be sinusoidal. In some embodiments, the target timing circuit 104 and the leakage timing circuit 106 include a free-running oscillator, such as a ring oscillator.

Figure 1B:
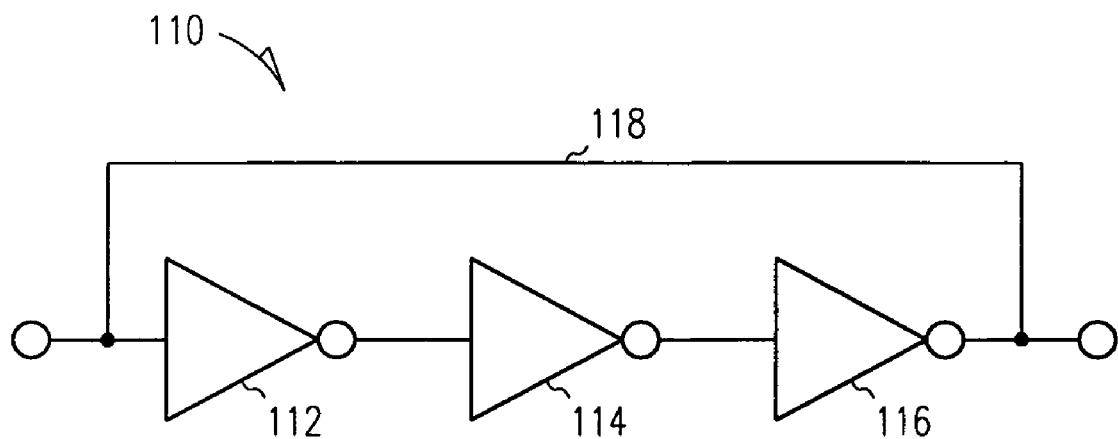
FIG. 1B is a schematic diagram of a ring oscillator suitable for use in implementing the target timing circuit and the leakage timing circuit, shown in FIG. 1A, in accordance with some embodiments of the present invention.

Referring to FIG. 1B, a ring oscillator 110 suitable for use in implementing the target timing circuit 104, shown in FIG. 1A, is shown in FIG. 1B and described below.

Figure 4A:
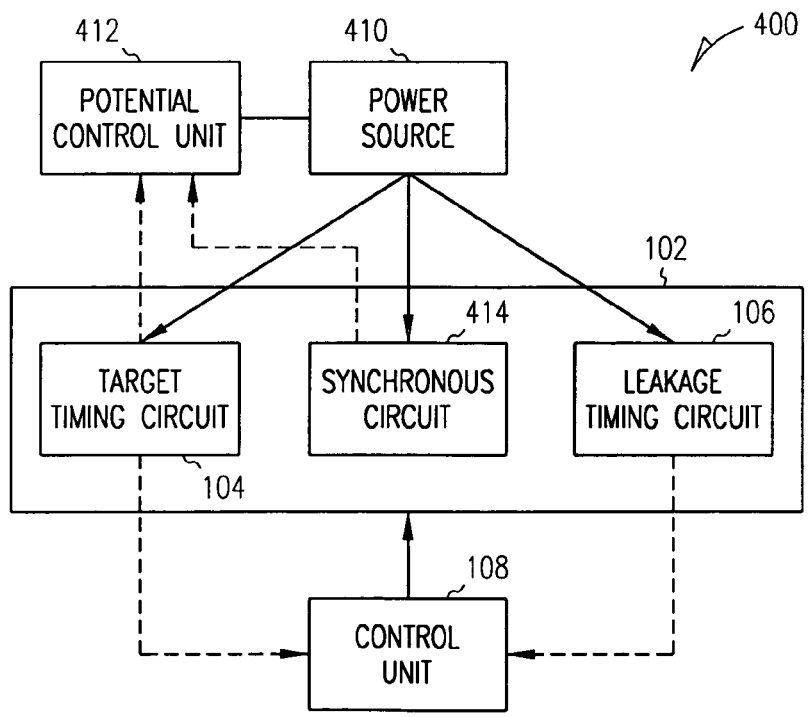
FIG. 4A is a block diagram of an apparatus including the substrate, the target timing circuit, the leakage timing circuit, and the control unit, shown in FIG. 1A, and a power source, a potential control unit, and a synchronous circuit in accordance with some embodiments of the present invention.
Figure 4B:
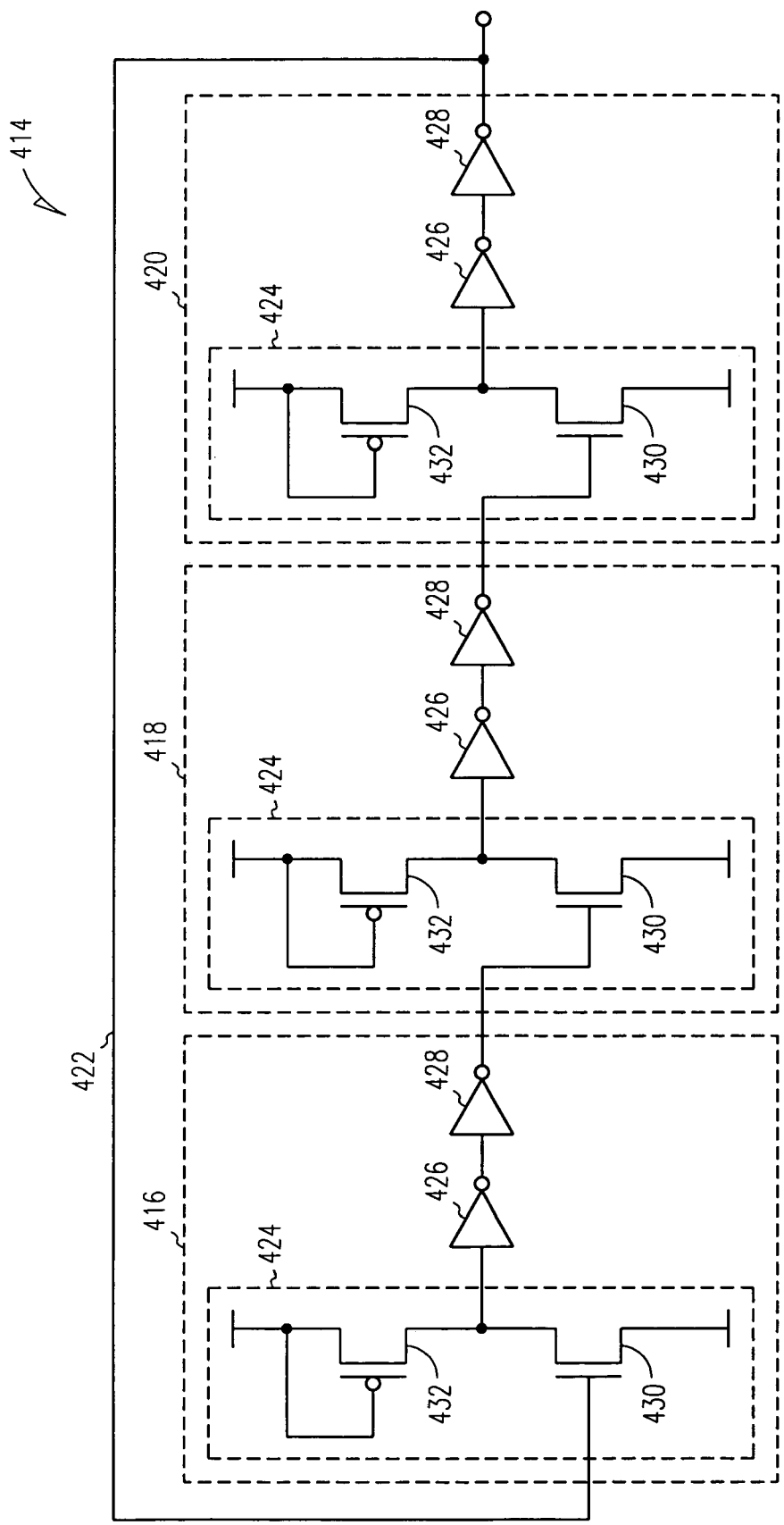
FIG. 4B is a schematic diagram of a p-leakage ring oscillator suitable for use in implementing the leakage timing circuit, shown in FIG. 4A, in accordance with some embodiments of the present invention.

Referring to FIG. 4B, a p-leakage ring oscillator 414, suitable for use in implementing the leakage timing circuit 106 shown in FIG. 1A, is shown in FIG. 4B and described below.

Figure 4C:
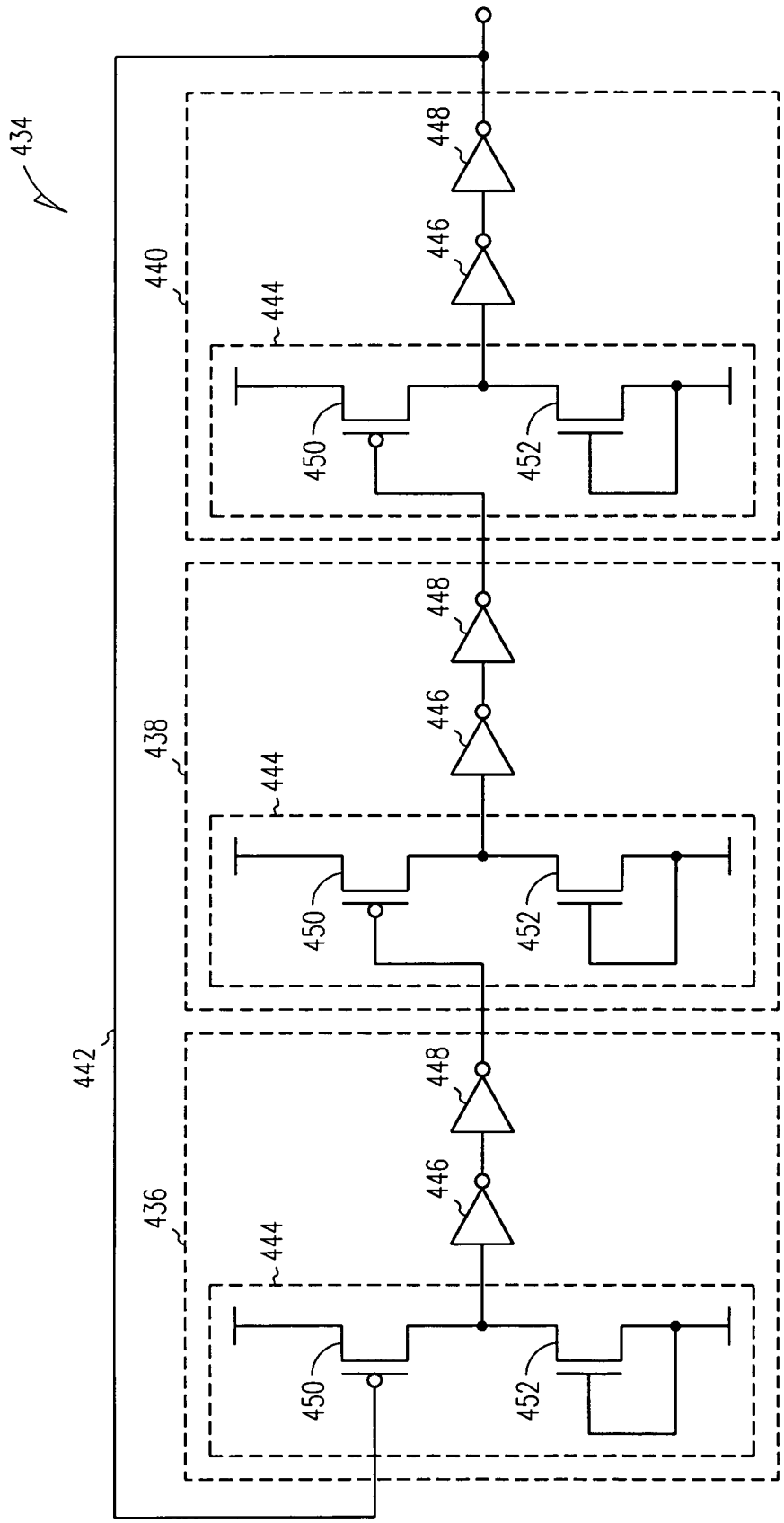
FIG. 4C is a schematic diagram of an n-leakage ring oscillator suitable for use in implementing the leakage timing circuit, shown in FIG. 4A, in accordance with some embodiments of the present invention.

Referring to FIG. 4C, an n-leakage ring oscillator 434, suitable for use in implementing the leakage timing circuit 106 shown in FIG. 1A, is shown in FIG. 4C and described below.

Figure 1C:
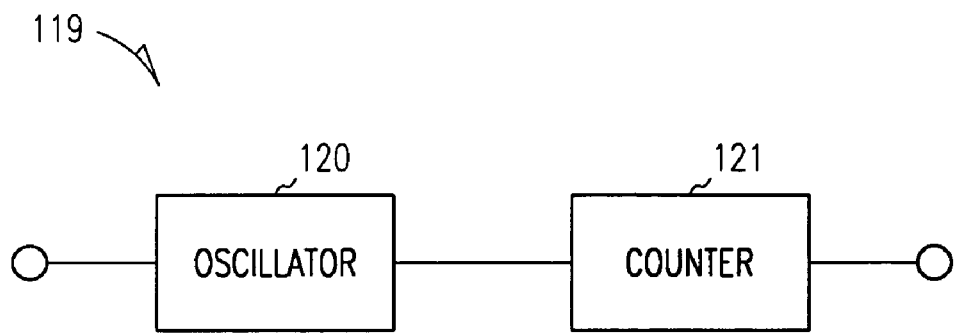
FIG. 1C is a block diagram of an oscillator/counter, including an oscillator coupled to a counter, suitable for use in implementing the target timing circuit or the leakage timing circuit, shown in FIG. 1A, in accordance with some embodiments of the present invention.

Referring again to FIG. 1A, in some embodiments, the target timing circuit 104 includes an oscillator, such as the ring oscillator 110, shown in FIG. 1B, coupled to a counter, as shown in FIG. 1C and described below.

Still referring to FIG. 1A, in some embodiments, the leakage timing circuit 106 includes an oscillator, such as the p-leakage ring oscillator 414 shown in FIG. 4B and described below, coupled to a counter, as shown in FIG. 1C and described below. In some embodiments, the leakage timing circuit 106 includes an oscillator, such as the n-leakage ring oscillator 434, shown in FIG. 4C and described below, coupled to a counter, as shown in FIG. 1C and described below.

Figure 1D:
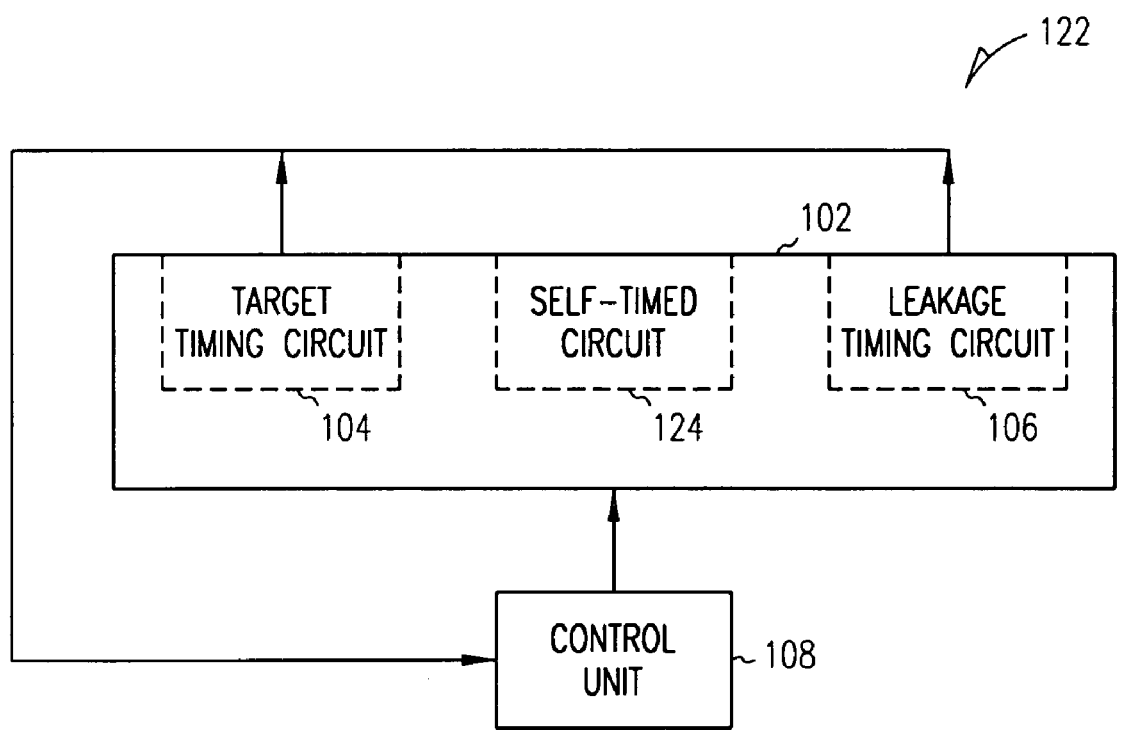
FIG. 1D is a block diagram of an apparatus including the substrate, the target timing circuit, the leakage timing circuit, and the control unit, shown in FIG. 1A, and further including a self-timed circuit in accordance with some embodiments of the present invention.

In operation, the control unit 108 maintains a substantially constant ratio between the frequency associated with the target timing circuit 104 and the frequency associated with the leakage timing circuit 106. Some embodiments suitable for maintaining a substantially constant ratio between the frequency associated with the target timing circuit 104 and the frequency associated with the leakage timing circuit 106 are shown in FIG. 1D and described below. The target timing circuit 104 has a frequency related to a target frequency. In some embodiments, the target frequency is the frequency of a self-timed circuit 124, shown in FIG. 1D and described below. The leakage timing circuit 106 has a frequency related to a leakage current. In some embodiments, the leakage current includes the leakage current of the self-timed circuit 124, shown in FIG. 1D and described below.

A leakage current is an uncontrolled current flowing in regions of a substrate in which no current should be flowing. For example, the self-timed circuit 124, shown in FIG. 1D, includes logic gates (not shown). When these logic gates turned off no current should be flowing in the logic gates. However, process variations may cause some logic gates in the self-timed circuit 124 to fail to turn off completely, and leakage current, such as static leakage current (the leakage current that flows when a gate is not completely turned off), can flow in those logic gates.

Those skilled in the art will appreciate that the operation of the apparatus 100 includes multiple frequency domains. The timing signals are not phase-locked. To synchronize the timing signals, the target timing circuit is divided down to a large enough period that a maximum synchronization-error (about two times the period of the synchronization target circuit) becomes negligibly small by comparison.

FIG. 1B is a schematic diagram of a ring oscillator 110 suitable for use in implementing the target timing circuit 104, shown in FIG. 1A, in accordance with some embodiments of the present invention. The ring oscillator 110 includes inverters 112, 114, and 116 and a feedback connection 118. The inverters 112, 114, and 116 are connected in series. The feedback connection 118 couples an output port of the inverter 116 to an input port of the inverter 112. The ring oscillator 110 includes three inverters, however, ring oscillators suitable for use in implementing the target timing circuit 104 are not limited to a particular number of inverters. The number of inverters is selected to provide the desired frequency of oscillation in the ring oscillator 110.

In operation, a signal transition at the input port to the inverter 112 occurs at output port of the inverter 116 after the three gate delays (ignoring delays associated with the transmission of signals between gates) associated with the inverters 112, 114, and 116. For example, if each of the inverters 112, 114, and 116 has a gate delay of one nanosecond, then a signal transition at the input port of the inverter 112 occurs at the output port of the inverter 116 after about three nanoseconds. The period of the resulting oscillation is about six nanoseconds. The frequency of the resulting oscillation is about 166 megahertz.

FIG. 1C is a block diagram of an oscillator/counter 119, including an oscillator 120 coupled to a counter 121, suitable for use in implementing the target timing circuit 102 or the leakage timing circuit 104, shown in FIG. 1A, in accordance with some embodiments of the present invention. The oscillator/counter 119 is useful for producing oscillations having a period that is long when compared to the gate delays of the inverters, such as the inverters 112, 114, and 116, shown in FIG. 1B, included in the ring oscillator 110. In some embodiments, the oscillator/counter 119 uses the ring oscillator 110 to implement the oscillator 120. In some embodiments, the oscillator/counter 119 uses the p-leakage ring oscillator 414, shown in FIG. 4B and described below, to implement the oscillator 120. In some embodiments, the oscillator/counter 119 uses the n-leakage ring oscillator 434, shown in FIG. 4C and described below, to implement the oscillator 120.

FIG. 1D is a block diagram of an apparatus 122 including the substrate 102, the target timing circuit 104, the leakage timing circuit 106, and the control unit 108, shown in FIG. 1A, and further including a self-timed circuit 124 in accordance with some embodiments of the present invention. The self-timed circuit 124 is formed on the substrate 102. The control unit 108 is coupled to the substrate 102, the target timing circuit 104, and the leakage timing circuit 106.

The self-timed circuit 124 is an asynchronous circuit. An asynchronous circuit uses a handshake to explicitly indicate the validity and acceptance of data. This is in contrast to a synchronous circuit which uses a globally distributed clock signal to indicate a time when data is valid. In some embodiments, the self-timed circuit 124 includes a series of inter-locked ring oscillators (not shown). The inter-locked ring oscillators are not synchronously clocked. As such, the self-timed circuit 124 operates at a speed determined by the slowest ring-oscillator. In these embodiments, the target frequency is the frequency of the slowest ring oscillator in the self-timed circuit 124.

In operation, the self-timed circuit 124 operates at a frequency proportional to the target frequency. The control unit 108 provides a control signal to the substrate 102 to maintain a substantially constant ratio between the frequency associated with the target timing circuit 104 and the frequency associated with the leakage timing circuit 106.

Figure 1E:
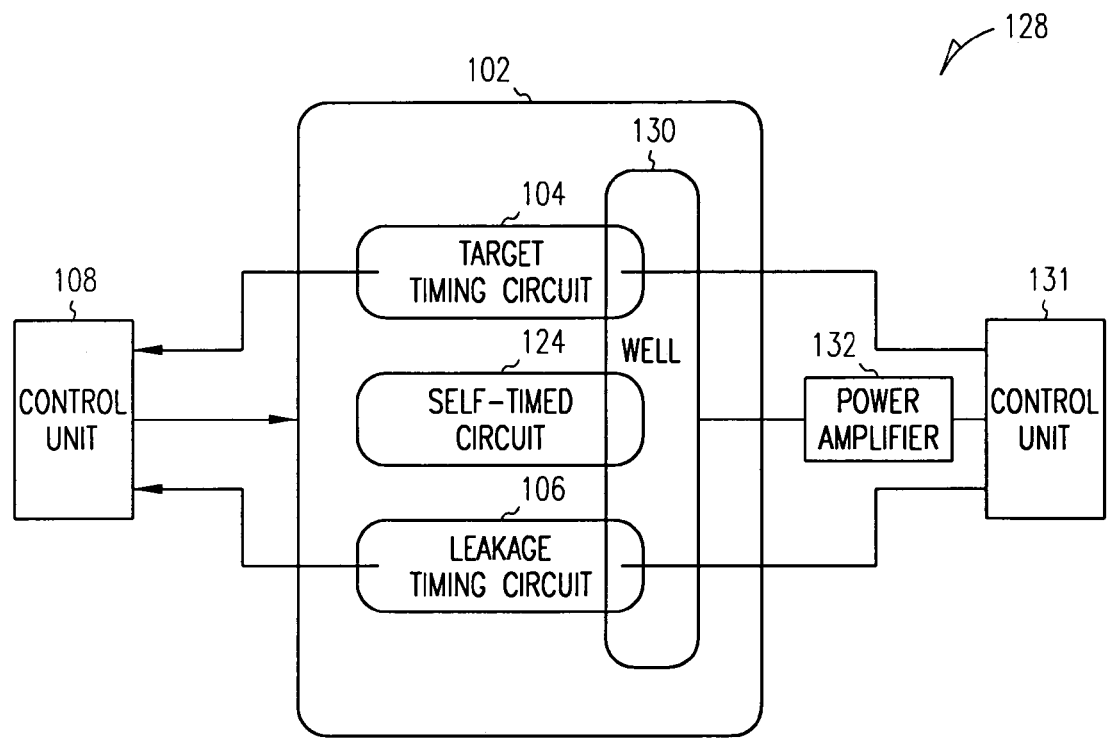
FIG. 1E is an illustration of an apparatus including the substrate, the target timing circuit, the leakage timing circuit, the control unit, and the self-timed circuit, shown in FIG. 1D, and further including a well, a control unit, and a power amplifier in accordance with some embodiments of the present invention.

FIG. 1E is an illustration of an apparatus 128 including the substrate 102, the target timing circuit 104, the leakage timing circuit 106, the control unit 108, and the self-timed circuit 124, and further including a well 130, a control unit 131, and a power amplifier 132 in accordance with some embodiments of the present invention. The illustration is substantially a top view of the substrate 102 showing a relative layout of the target timing circuit 104, the leakage timing circuit 106, the self-timed circuit 124, and the well 130. The target timing circuit 104 includes transistors (not shown) formed in the well 130 and transistors (not shown)

formed in the substrate 102 but not in the well 130. The leakage timing circuit 106 includes transistors (not shown) formed in the well 130 and transistors (not shown) formed in the substrate 102 but not in the well 130. The self-timed circuit 104 includes transistors (not shown) formed in the well 130 and transistors (not shown) formed in the substrate 102 but not in the well 130. The control unit 108 is coupled to the timing circuit 104, the leakage timing circuit 106, and the substrate 102. The control unit 131 is coupled to the target timing circuit 104, the leakage timing circuit 106, and the well 130. The power amplifier 132 couples the control unit 131 to the well 130.

The leakage timing circuit 106 includes transistors formed in the well 130 and transistors formed in the substrate 102 but not in the well 130. The transistors formed in the well 130 provide a leakage current to generate a well leakage frequency. The well leakage frequency is provided to the control unit 131 which forms a ratio between the well leakage frequency and the frequency related to the target timing circuit 104. The control unit 131 maintains a substantially constant ratio between the frequency related to the frequency of the target timing circuit 104 and the frequency related to the well leakage current by applying a bias to the well 130.

The transistors formed in the substrate 102 but not in the well 130 provide a leakage current to generate a substrate leakage frequency. The substrate leakage frequency is provided to the control unit 108 which forms a ratio between the substrate leakage frequency and the frequency related to the target timing circuit 104. The control unit 108 maintains a substantially constant ratio between the frequency related to the frequency of the target timing circuit 104 and the frequency related to the well leakage current by applying a bias to the substrate 102.

The well 130 is not limited to a well having a particular doping. In some embodiments, the well 130 includes an n-well. In some embodiments, the well 130 includes a p-well. The apparatus 128 is not limited to a single well 130. Multiple wells can be formed on the substrate 102. Those skilled in the art will appreciate that the multiple wells can be discontinuous. Each well can also have a bias tap. Thus, each well may be biased separately or two-or-more wells may be shorted together and the shorted wells can receive a common bias.

The power amplifier 132 provides a current capable of changing the voltage on the well 130 quickly. The well 130 may include a large capacitance, so to change the voltage on the well 130 quickly, a large current may be needed. In addition, voltage or current amplification may be required to provide a direct current to the well 130. The power amplifier 132 is not limited to a particular type of power amplifier. In some embodiments, the power amplifier 132 includes an insulated-gate field-effect transistor. The current provided by the power amplifier 132 is large when compared to signal currents in the self-timed circuit 124. In some embodiments, the current provided by the power amplifier 132 is between about one-half ampere and several amperes. A current of less than about one-half ampere may not be sufficient to change the voltage on the well 130 quickly. A current of more than several amperes may require special metallization on the substrate 102 to couple the power amplifier 132 to the well 130.

In operation, the control unit 108 provides a control signal to the substrate 102 to maintain a substantially constant ratio between the frequency (the target frequency) associated with the target timing circuit 104 and the frequency associated with the leakage timing circuit 106.

In operation, the control unit 131 provides a control signal to the well 130 to maintain a substantially constant ratio between the frequency (the target frequency) of the target timing circuit 104 and the frequency of the leakage timing circuit 106. The power amplifier 132 provides a current to the well 130 for changing the voltage at the well 130 quickly in response to the control signal provided by the control unit 131.

Figure 2:
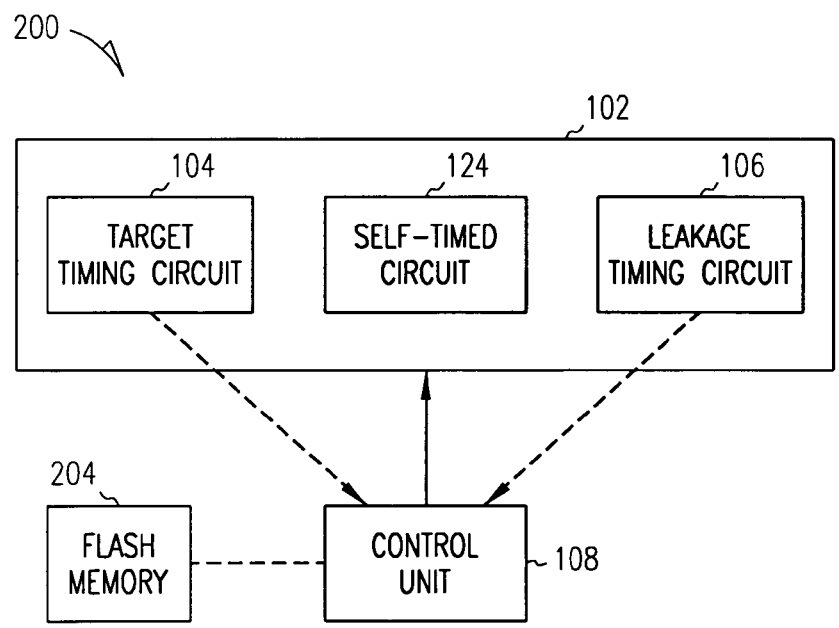
FIG. 2 is a block diagram of a system including the substrate, the timing circuits, and the control unit, shown in FIG. 1A, and further including a target circuit and a flash memory in accordance with some embodiments of the present invention.

FIG. 2 is a block diagram of a system 200 including the substrate 102, the target timing circuit 104, the leakage timing circuit 106, and the control unit 108, shown in FIG. 1A, and further including a self-timed circuit 124 and a flash memory 204 in accordance with some embodiments of the present invention. The target timing circuit 104, the leakage timing circuit 106, and the self-timed circuit 124 are formed on the substrate 102. The control unit 108 is coupled to the flash memory 204.

In some embodiments, the self-timed circuit 124 includes a peripheral device communication interface. Exemplary peripheral devices suitable for use in connection with the system 200 include storage devices, such as magnetic recording devices and optical recording devices, input/output devices, such as printers or displays, and memory devices. In some embodiments, the self-timed circuit 124 includes a network communication interface. Exemplary network communication systems suitable for use in connection with the system 200 include local area networks, wide area networks, and wireless communication systems.

The flash memory 204 provides non-volatile storage for the control unit 108. Non-volatile storage retains data after power is removed. The flash memory 204 is semiconductor non-volatile storage.

In operation, the control unit 108 retrieves information from the flash memory 204.

Figure 3:
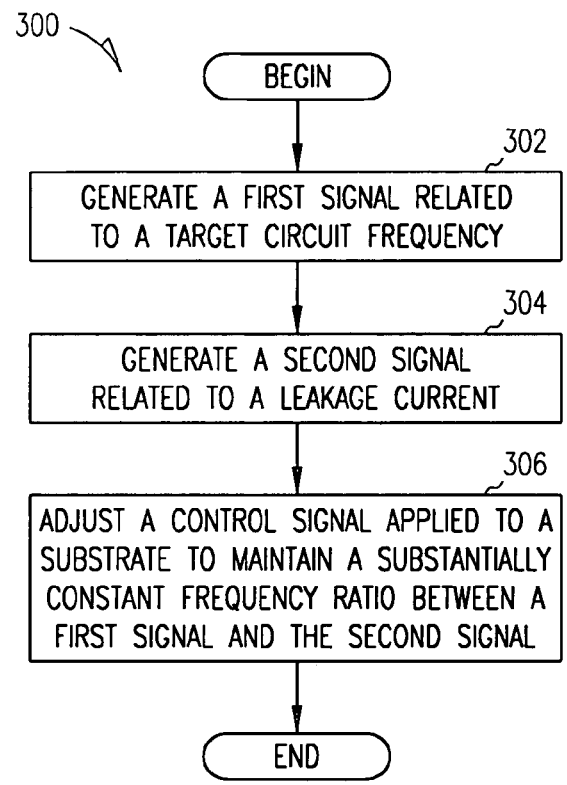
FIG. 3 is a flow diagram of a method for controlling self-timed and synchronous systems in accordance with some embodiments of the present invention.

FIG. 3 is a flow diagram of a method 300 for controlling self-timed systems in accordance with some embodiments of the present invention. The method 300 includes generating a first signal related to a target circuit frequency (block 302), generating a second signal related to a leakage current (block 304), and adjusting a control signal applied to a substrate to maintain a substantially constant frequency ratio between a first signal and the second signal (block 306) in accordance with some embodiments of the present invention.

In some embodiments, the method 300 further includes, for a communications circuit formed on the substrate, activating a transceiver in the communications circuit.

In some embodiments, the method 300 further includes, processing the target circuit frequency and a target ring oscillator frequency to generate a potential control signal to adjust a potential applied to a target ring oscillator, a leakage ring oscillator, and a target circuit that operates at the target circuit frequency.

In some embodiments, the method 300 further includes, for a communications circuit formed on the substrate, activating a transceiver in the communications circuit.

FIG. 4A is a block diagram of an apparatus 400 including the substrate 102, the target timing circuit 104, the leakage timing circuit 106, and the control unit 108, shown in FIG. 1A, and a power source 410, a potential control unit 412, and a synchronous circuit 414 in accordance with some embodiments of the present invention. The target timing circuit 104, the leakage timing circuit 106, and the synchronous circuit 414 are formed on the substrate 102. The control unit 108 includes a low-leakage control signal to set the synchronous circuit to a low leakage state.

The target timing circuit 104 and the leakage timing circuit 106 are responsive to the supply voltage and to the substrate or well bias voltages. The ring oscillator 110, shown in FIG. 1C, and described above is suitable for use in implementing the target timing circuit 104. A leakage ring oscillator, such as a p-leakage ring oscillator 414, shown in FIG. 4B and described below, or the n-leakage ring oscillator 434, shown in FIG. 4C and described below, are each suitable for use in implementing the leakage timing circuit 106.

The synchronous circuit 414 operates at a target circuit frequency. A synchronous circuit uses a globally distributed clock signal to indicate a time when data is valid. The synchronous circuit 414 is not limited to a particular type of synchronous circuit. In some embodiments, the synchronous circuit 414 is a processor. Exemplary processors include complex instruction set processors, reduced instruction set processors, very long instruction word processors, digital signal processors, and graphics processors.

The target timing circuit 104 depends on Vcc, substrate voltage, well voltage, and Tj. The synchronous circuit 414 depends on substantially the same variables in substantially the same way. And the frequency of the leakage timing circuit 106 depends on substantially the same variables in a manner reflective of the leakage of the synchronous circuit.

In operation, the control unit 108 receives the target timing circuit signal, the leakage timing circuit signal, and generates a control signal for application to the substrate 102 to maintain a substantially constant ratio between the frequency of the target timing circuit 104 and the frequency of the leakage timing circuit 106. The potential control unit 412 receives the target circuit frequency and the target ring oscillator frequency and generates a potential control signal to provide to the power source 410. The power source provides a potential to the target timing circuit 104, the leakage timing circuit 106, and the synchronous circuit 414 to control the frequency of the target timing circuit 104, and of the leakage timing circuit 106. The potential is changed to maintain a substantially constant ratio between the frequency of the target timing circuit and the frequency of the synchronous circuit.

FIG. 4B is a schematic diagram of a p-leakage ring oscillator 414 suitable for use in implementing the leakage timing circuit 106, shown in FIG. 4A, in accordance with some embodiments of the present invention. The p-leakage ring oscillator 414 includes stages 416, 418, and 420, which are substantially identical. The stages 416, 418, and 420 are connected in series. The feedback connection 422 couples an output port of the stage 420 to an input port of the stage 416.

Each of the stage 416, 418, and 420 includes a leakage inverter 424 connected in series with inverters 426 and 428. Each leakage inverter 424 includes an n-type device 430 and a p-type device 432. Each leakage inverter 424 is designed such that the leakage current in the n-type device 430 is significantly less than that of the p-type device 432 when both are in an off state. This may be achieved by selecting the width of the n-type device 430 to be many times smaller than the width of the p-type device 432 and selecting the channel length of the n-type device 430 to be longer than the process minimum.

In operation, a signal transition at the input port to the stage 416 occurs at the output port of the stage 420 after three stage delays. Each stage delay includes the delay of the leakage inverter 424 and the delays of the inverters 426 and 428 (ignoring delays associated with the transmission of signals between gates) associated with each of the stages 416, 418, and 420.

FIG. 4C is a schematic diagram of an n-leakage ring oscillator 434 suitable for use in implementing the leakage timing circuit 106, shown in FIG. 4A, in accordance with some embodiments of the present invention. The n-leakage ring oscillator 434 includes stages 436, 438, and 440, which are substantially identical. The stages 436, 438, and 440 are connected in series. The feedback connection 442 couples an output port of the stage 440 to an input port of the stage 436.

Each of the stage 436, 438, and 440 includes a leakage inverter 444 connected in series with inverters 446 and 448. Each leakage inverter 444 includes a p-type device 450 and an n-type device 452. Each leakage inverter 444 is designed such that the leakage current in the p-type device 450 is significantly less than that of the n-type device 452 when both are in an off state. This may be achieved by selecting the width of the p-type device 450 device to be many times smaller than the width of the n-type device 442 and selecting the channel length of the p-type device 450 to be longer than the process minimum.

In operation, a signal transition at the input port to the stage 436 occurs at the output port of the stage 440 after three stage delays. Each stage delay includes the delay of the leakage inverter 444 and the delays of the inverters 446 and 448 (ignoring delays associated with the transmission of signals between gates) associated with each of the stages 436, 438, and 440.

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances of "an embodiment," "one embodiment," or "some embodiments" are not necessarily all referring to the same embodiments.

If the specification states a component, feature, structure, or characteristic "may," "might," or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Although specific embodiments have been described and illustrated herein, it will be appreciated by those skilled in the art, having the benefit of the present disclosure, that any arrangement which is intended to achieve the same purpose may be substituted for a specific embodiment shown. This application is intended to cover any adaptations or variations of the present invention. Therefore, it is intended that this invention be limited only by the claims and the equivalents thereof.

What is claimed is:

1. An apparatus comprising:
   a substrate;
   a target timing circuit formed on the substrate, the target timing circuit having a frequency related to a target frequency;
   a leakage timing circuit formed on the substrate, the leakage timing circuit having a frequency related to a leakage current; and
   a control unit to maintain a substantially constant ratio between the frequency related to the target frequency and the frequency related to the leakage current.

2. The apparatus of claim 1, wherein the substrate comprises a semiconductor.

3. The apparatus of claim 2, wherein the target timing circuit comprises a ring oscillator coupled to a counter.

4. The apparatus of claim 3, wherein the leakage timing circuit comprises a ring oscillator.

5. The apparatus of claim 4, wherein the frequency related to the leakage current is substantially proportional to the leakage current.

6. The apparatus of claim 1, further comprising a self-timed circuit formed on the substrate, the self-timed circuit to operate at a frequency proportional to the target frequency.

7. The apparatus of claim 6, the control unit to provide a control signal to the substrate.

8. The apparatus of claim 6, wherein the substrate includes a plurality of coupled wells containing transistors of a matching type from the self-timed circuit, the target timing circuit, and the leakage timing circuit.

9. The apparatus of claim 8, wherein the transistors are all of the matching type.

10. The apparatus of claim 9, further comprising a well control unit to provide a bias to the plurality of coupled wells.

11. The apparatus of claim 10, wherein the well comprises a p-type well.

12. A system comprising:
a substrate;
a target timing circuit formed on the substrate, the target timing circuit having a frequency related to a target frequency;
a leakage timing circuit formed on the substrate, the leakage timing circuit having a frequency related to a leakage current;
a control unit coupled to a flash memory and to maintain a substantially constant ratio between the frequency related to the target frequency and the frequency related to the leakage current; and
a self-timed circuit formed on the substrate, and the self-timed circuit to operate at a frequency proportional to the target frequency.

13. The system of claim 12, wherein the self-timed circuit comprises a memory device communication interface.

14. The system of claim 12, wherein the self-timed circuit comprises a peripheral device communication interface.

15. The system of claim 12, wherein the self-timed circuit comprises a network communication interface.

16. An apparatus comprising:
a substrate;
a self-timed circuit formed on the substrate, the self-timed circuit to operate at a target circuit frequency;
a target timing circuit formed on the substrate, the target timing circuit to generate a signal having a frequency related to the target circuit frequency;
a leakage timing circuit formed on the substrate, the leakage timing circuit having a leakage current and the leakage timing circuit to generate a signal having a frequency related to the leakage current; and
a control unit to receive the signal having the frequency related to the target circuit frequency and the signal having the frequency related to the leakage current and to generate a control signal for application to the substrate, the control signal to maintain a substantially constant ratio between the frequency related to the target circuit frequency and the frequency related to the leakage current.

17. The apparatus of claim 16, wherein the substrate comprises silicon.

18. The apparatus of claim 17, wherein the target circuit comprises an interface circuit.

19. The apparatus of claim 18, wherein the target ring oscillator comprises a ring oscillator coupled to a counter.

20. The apparatus of claim 19, wherein the leakage ring oscillator comprises a delay line.

21. An apparatus comprising:
a substrate;
a synchronous circuit formed on the substrate, the synchronous circuit to operate at a target circuit frequency;
a target timing circuit formed on the substrate, the target timing circuit including voltage control, the target timing circuit to generate a signal having a frequency related to the target circuit frequency;
a leakage timing circuit formed on the substrate, the leakage timing circuit including voltage control, the leakage timing circuit having a leakage current and the leakage timing circuit to generate a signal having a frequency related to the leakage current;
a control unit to receive the signal having a frequency related to the target circuit frequency, the signal having a frequency related to the leakage current, and to generate a control signal for application to the substrate, the control signal to maintain a substantially constant ratio between the frequency related to the target circuit frequency and the frequency related to the leakage current;
a power source to provide a potential to the synchronous, the target timing circuit, and the leakage timing circuit; and
a potential control unit to receive the signal having the frequency related to the target circuit frequency and the signal having the frequency related to the leakage current and to generate a potential control signal to provide to the power source to adjust the potential.

22. The apparatus of claim 21, wherein the substrate comprises silicon.

23. The apparatus of claim 22, wherein the synchronous circuit comprises a processor.

24. The system of claim 23, wherein the processor comprises a very long instruction word processor.

25. The apparatus of claim 21, wherein the control unit includes a low-leakage control signal to set the target circuit to a low leakage state.

26. A method comprising:
generating a first signal related to a target circuit frequency;
generating a second signal related to a leakage current; and
adjusting a control signal applied to a substrate to maintain a substantially constant frequency ratio between the first signal and the second signal.

27. The method of claim 26, further comprising for a processor formed on the substrate and having an operating frequency and a supply voltage, changing the supply voltage to maintain a relationship between the target circuit frequency and the operating frequency.

28. The method of claim 26, further comprising for a communications circuit formed on the substrate, activating a transceiver in the communications circuit.

29. The method of claim 26, further comprising processing the target circuit frequency and a target ring oscillator frequency to generate a potential control signal to adjust a potential applied to a target ring oscillator, a leakage ring oscillator, and a target circuit that operates at the target circuit frequency.

30. The method of claim 29, further comprising for a communications circuit formed on the substrate, activating a transceiver in the communications circuit.

* * * * *